US012766604B2

(12) United States Patent
Göberl

(10) Patent No.: US 12,766,604 B2
(45) Date of Patent: Oct. 20, 2026

(54) CUTTING ELEMENT

(71) Applicant: CERATIZIT AUSTRIA GESELLSCHAFT M.B.H, Reutte (AT)

(72) Inventor: Christian Göberl, Reutte (AT)

(73) Assignee: Ceratizit Austria Gesellschaft mbH, Reutte (AT)

( * ) Notice: Subject to any disclaimer, the term of this patent is extended or adjusted under 35 U.S.C. 154(b) by 371 days.

(21) Appl. No.: 18/559,106

(22) PCT Filed: Apr. 28, 2022

(86) PCT No.: PCT/AT2022/060144

§ 371 (c)(1),
(2) Date: Nov. 6, 2023

(87) PCT Pub. No.: WO2022/232855

PCT Pub. Date: Nov. 10, 2022

(65) Prior Publication Data

US 2024/0227027 A1 Jul. 11, 2024

(30) Foreign Application Priority Data

May 5, 2021 (AT) .......................... GM 50102/2021

(51) Int. Cl.
*B23B 27/04* (2006.01)
*B23B 27/22* (2006.01)
(Continued)

(52) U.S. Cl.
CPC .......... *B23B 27/045* (2013.01); *B23B 27/143* (2013.01); *B23B 27/1607* (2013.01);
(Continued)

(58) Field of Classification Search
CPC ............ B23B 27/045; B23B 2200/087; B23B 2200/202; B23B 27/22; B23B 2200/123;
(Continued)

(56) References Cited

U.S. PATENT DOCUMENTS 4,844,668 A * 7/1989 Pettersson ............. B23B 27/045 407/116
5,205,680 A * 4/1993 Lindstedt .............. B23B 27/045 407/116
(Continued)

FOREIGN PATENT DOCUMENTS

CN 107790755 A * 3/2018 ............. B23B 27/00
CN 111468748 A * 7/2020 ........... B23B 27/005
(Continued)

*Primary Examiner* — Sara Addisu
(74) *Attorney, Agent, or Firm* — Laurence A. Greenberg; Werner H. Stemer; Ralph E. Locher

(57) ABSTRACT

A cutting element has a cutting head and a shaft. The cutting head is carried by the shaft and protrudes over the shaft transversely relative to a longitudinal extent of the shaft. The cutting head has a cutting edge, the cutting edge follows a circle segment with a circle center at a side of the shaft located in a virtual cutting head plane and is constructed symmetrically, when viewed in a direction perpendicular to the cutting head plane, with respect to a virtual cutting edge axis of symmetry which is contained in the cutting head plane. The cutting head has a chip guiding structure. The chip guiding structure is associated with the cutting edge, has a chip guiding groove and a plurality of chip guiding elements. Each chip guiding element has a longitudinal rib and a transverse rib.

15 Claims, 6 Drawing Sheets

(51) Int. Cl.
*B23B 27/14* (2006.01)
*B23B 27/16* (2006.01)

(52) U.S. Cl.
CPC . *B23B 2200/0461* (2013.01); *B23B 2200/081* (2013.01); *B23B 2200/087* (2013.01); *B23B 2200/123* (2013.01); *B23B 2200/202* (2013.01)

(58) Field of Classification Search
CPC .... B23B 2200/0442; B23B 2200/0461; B23B 27/1607; B23B 27/143; B23B 2200/0414; B23B 2200/286; B23B 2200/321; B23B 2200/328; Y10T 407/245
See application file for complete search history.

(56) References Cited

U.S. PATENT DOCUMENTS

| | | | | | |
|---|---|---|---|---|---|
| 5,265,985 | A | * | 11/1993 | Boppana | B23B 27/143 D15/139 |
| 5,342,151 | A | * | 8/1994 | Friedmann | B23B 27/045 407/116 |
| 6,715,968 | B1 | * | 4/2004 | Tagtstrom | B23B 27/045 407/116 |
| 6,796,752 | B2 | * | 9/2004 | Tong | B23B 27/045 407/115 |
| 9,278,393 | B2 | * | 3/2016 | Sakai | B23B 27/22 |
| 10,022,802 | B2 | | 7/2018 | Kaufmann et al. | |
| 12,053,827 | B2 | * | 8/2024 | Lof | B23B 27/1614 |
| 2003/0170081 | A1 | * | 9/2003 | Andersson | B23B 27/045 407/116 |
| 2009/0226269 | A1 | * | 9/2009 | Iyori | B23B 27/143 407/113 |
| 2013/0213196 | A1 | * | 8/2013 | Sakai | B23B 27/045 407/116 |
| 2015/0343534 | A1 | * | 12/2015 | Kaufmann | B23B 27/10 407/11 |
| 2016/0136734 | A1 | * | 5/2016 | Kaufmann | B23B 27/045 407/115 |
| 2019/0009345 | A1 | * | 1/2019 | An | B23B 27/22 |
| 2026/0001140 | A1 | * | 1/2026 | Sasaki | B23B 27/10 |

FOREIGN PATENT DOCUMENTS

| | | | | | |
|---|---|---|---|---|---|
| CN | 112236257 | A | * | 1/2021 | B23B 27/1611 |
| DE | 3105377 | A | * | 10/1982 | B23B 27/16 |
| DE | 4310131 | A1 | * | 10/1994 | B23B 27/141 |
| DE | 202010017106 | U1 | * | 4/2011 | B23B 27/045 |
| DE | 102014116660 | A1 | | 5/2016 | |
| DE | 102018104405 | A1 | * | 8/2019 | B23B 27/145 |
| EP | 467872 | A | * | 1/1992 | B23B 27/06 |
| EP | 4674548 | A1 | * | 1/2026 | B23B 27/141 |
| JP | 2010082732 | A | | 4/2010 | |
| WO | WO-2005035173 | A1 | * | 4/2005 | B23B 27/045 |
| WO | WO-2014017623 | A1 | * | 1/2014 | B23B 27/045 |
| WO | WO-2014034614 | A1 | * | 3/2014 | B23B 29/043 |
| WO | WO-2014190363 | A1 | * | 12/2014 | B23B 27/22 |
| WO | WO-2018042957 | A1 | * | 3/2018 | B23B 27/1618 |

* cited by examiner

CUTTING ELEMENT

FIELD AND BACKGROUND OF THE INVENTION

The present invention relates to a cutting element, wherein the cutting element has a cutting head and a shaft, wherein the cutting head is carried by the shaft and protrudes over the shaft transversely relative to the longitudinal extent of the shaft, wherein the cutting head has a cutting edge, wherein the cutting edge follows a circle segment with a circle centre at the side of the shaft, is located in a virtual cutting head plane and is constructed symmetrically, when viewed in a direction perpendicular to the cutting head plane with respect to a virtual cutting edge axis of symmetry which is contained in the cutting head plane, wherein the cutting head has a chip guiding structure, wherein the chip guiding structure is associated with the cutting edge.

Such a cutting element can be used to produce grooves in a workpiece while rotating at different feed angles. The chip guiding structure guides the chips produced during feeding away from the cutting edge with a chip breakage so that the chips do not impair the feed process.

DE 10 2014 116 660 A1 sets out a cutting insert. In the cutting insert known from DE 10 2014 116 660 A1 there is a requirement to break the chips so as to be shorter.

SUMMARY OF THE INVENTION

An object of the present invention is to provide a cutting element with improved chip breakage.

The technical objective of the present invention is achieved with the subject-matter of the independent claim. Advantageous further developments of the invention can be derived from the dependent claims, which can be freely combined with each other, and the Figures.

According to the present invention, the cutting element has a cutting head and a shaft, wherein the cutting head is carried by the shaft and protrudes over the shaft transversely relative to the longitudinal extent of the shaft, wherein the cutting head has a cutting edge, wherein the cutting edge follows a circle segment with a circle centre at the side of the shaft, is located in a virtual cutting head plane and is constructed symmetrically, when viewed in a direction perpendicular to the cutting head plane, with respect to a virtual cutting edge axis of symmetry which is contained in the cutting head plane, wherein the cutting head has a chip guiding structure, wherein the chip guiding structure is associated with the cutting edge, wherein the chip guiding structure has a chip guiding groove which is constructed to follow the cutting edge when viewed in a direction perpendicular to the cutting head plane and a plurality of chip guiding elements which are constructed in the region of the chip guiding groove, wherein each chip guiding element has a longitudinal rib and a transverse rib, wherein the longitudinal rib of each chip guiding element has a rib ridge and rib flanks which decline from the rib ridge at both sides, wherein the rib ridge of each longitudinal rib, when viewed in a direction perpendicular to the cutting head plane, extends in each case substantially radially away from the cutting edge and is arranged between the transverse rib and the cutting edge, wherein in each chip guiding element the transverse rib protrudes, when viewed in a direction perpendicular to the cutting head plane, transversely relative to the longitudinal extent of the rib ridge over the rib ridge so that chips when rising from the chip guiding groove strike the transverse rib when the chips are guided by the longitudinal rib.

The transverse rib ensures in each chip guiding element that the chips are compressed when rising from the chip guiding groove and thus break more easily.

The longitudinal rib in each chip guiding element ensures that the chips are guided from the cutting edge to the transverse rib and at the same time are prevented from laterally escaping transversely relative to the rib ridge.

Between the transverse ribs of two chip guiding elements which are adjacent to each other when viewed in a direction perpendicular to the cutting head plane, a transverse rib valley is formed. As a result of the transverse rib valley, coolant fluid can reach the cutting edge.

The transverse rib and the longitudinal rib may in at least one of the chip guiding elements form an integral projection in the chip guiding groove or the transverse rib and the longitudinal rib can in at least one chip guiding element be spaced apart from each other in a radial direction with respect to the cutting edge in the chip guiding groove.

Preferably, at least two of the rib ridges terminate with the same spatial spacing in each case with respect to the cutting edge. This makes the chip guiding away from the cutting edge homogeneous under various feed angles.

The rib ridges have in each chip guiding element a rib ridge face, wherein the rib flanks decline from the rib ridge face at both sides with an edge being formed.

Preferably, at least one of the chip guiding elements has a longitudinal rib base, wherein the longitudinal rib base carries the longitudinal rib of the chip guiding element with the longitudinal rib base. The longitudinal rib base preferably has longitudinal rib base flanks, wherein the longitudinal rib base flanks decline at both sides from the rib flanks with an edge being formed and, when viewed in a direction perpendicular to the cutting head plane, protrude over the rib flanks. The longitudinal rib base flanks make the transition from the longitudinal rib to the chip guiding groove gentler so that the longitudinal rib starting from a powdered material can be pressed and sintered in a more homogeneous manner.

The cutting edge may have a cutting edge chamfer, wherein the cutting edge chamfer is a portion of the chip guiding structure and wherein the cutting edge chamfer is connected to at least one longitudinal rib with an edge being formed. The chips can slide from the cutting edge chamfer along the rib flanks of this longitudinal rib into the chip guiding groove so that the chips are pre-deformed with respect to their deformation on the transverse rib.

The chip guiding groove declines at the side of the cutting edge and rises at the side of the transverse ribs.

The chip guiding groove follows the cutting edge when viewed in a direction perpendicular to the cutting head plane.

The term "extends substantially radially away" is intended to mean with respect to the longitudinal ribs that the rib ridges, when viewed in a direction perpendicular to the cutting head plane, can each be rotated with respect to a radial starting position about the radial starting position in the range from −15° to +15°. 0° is the radial starting position.

The cutting head is preferably formed from a hard metal (cemented carbide).

Hard metal is a composite material, wherein the composite material has a frame structure, wherein the frame structure is formed by means of hard material particles and has intermediate spaces.

The hard material particles may in particular be formed at least primarily from tungsten carbide, titanium carbide and/or titanium carbonitride, wherein in smaller quantities in addition, for example, other hard material particles, in particular carbides of the elements of the groups IV to VI of the periodic table, may also be present.

The intermediate spaces are filled with a metal intermediate space material, wherein the intermediate space material is formed at least primarily from cobalt, nickel, iron or a base alloy of at least one of these elements. However, other elements may also be dissolved in smaller quantities in the metal intermediate space material.

The term "base alloy" is intended to be understood to mean that this element forms the main component of the alloy. Most often, hard metal is used in which the hard material particles are formed at least primarily by tungsten carbide and the intermediate space material is a cobalt or cobalt/nickel base alloy; the proportion by weight of the corresponding tungsten carbide particles is in this case in particular at least 70% by weight, preferably more than 80% by weight, most preferably more than 90 percent by weight.

The cutting head and the shaft are preferably constructed as an integral element so that no boundary is formed between the cutting head and the shaft. The stability of the cutting element is thereby increased.

According to a further development of the cutting element, the transverse rib in at least one chip guiding element, in a rib longitudinal section which is orientated radially with respect to the cutting edge, when viewed in a direction perpendicular to the rib longitudinal section, is curved in a convex manner at the side of the rib ridge. This ensures that the chips under the compression brought about by the transverse rib can slide better along the transverse rib. A chip blockage on the transverse rib is better prevented, which further improves the chip removal. Preferably, the transverse rib is similarly curved in a convex manner in each chip guiding element of the transverse rib of this further development.

The rib longitudinal section preferably extends centrally through the rib ridge when viewed in a direction perpendicular to the cutting head plane.

According to a further development of the cutting element, the longitudinal rib, in the at least one chip guiding element in the rib longitudinal section which is orientated radially with respect to the cutting edge, when viewed in a direction perpendicular to the rib longitudinal section, is curved in a concave manner at the side of the cutting edge. This ensures that the chips can slide better into the chip guiding groove.

According to a further development of the cutting element, at least one chip guiding element is, in a rib longitudinal section orientated radially with respect to the cutting edge, when viewed in a direction perpendicular to the rib longitudinal section, in the form of a capital letter S, wherein one curve of the capital letter S is formed in the region of the transverse rib so that the transverse rib is curved outwards, wherein the other curve of the capital letter S is formed in the region of the rib ridge so that the rib ridge is curved inwards. The chip guiding element of this further development ensures that the chips when rising from the chip guiding groove are compressed by the transverse rib directly after leaving the longitudinal rib. The chips are additionally impeded from coiling backwards in the direction towards the cutting edge.

Furthermore, chips which are guided on the rib ridge are also bent over and can thus strike the transverse rib. The rib longitudinal section of this further development may be arranged in a similar manner to the rib longitudinal section described with respect to the convex transverse rib.

According to a further development of the cutting element, in at least one chip guiding element the transverse rib, when viewed in a direction perpendicular to the cutting head plane, protrudes over the rib ridge at both sides transversely relative to the longitudinal extent of the rib ridge. The chips are according to this further development deformed at both sides with respect to the rib ridge by the transverse rib, which increases the proportion of deformed chips to the advantage of the chip guiding in the event of a chip breaking away from the cutting edge.

According to a further development of the cutting element, in at least one chip guiding element the transverse rib is, when viewed in a direction perpendicular to the cutting head plane, in the form of a capital letter D, wherein the curve of the capital letter D faces the cutting edge when viewed in a direction perpendicular to the cutting head plane. The D shape of the transverse rib ensures that the chips are deformed on the transverse rib transversely to the longitudinal extent of the rib ridge without any risk of a chip blockage increasing.

According to a further development of the cutting element, at least one chip guiding element has a rib base, wherein the rib base carries the transverse rib with an edge being formed with the transverse rib, protrudes, when viewed in a direction perpendicular to the cutting head plane, transversely with respect to the longitudinal extent of the rib ridge over the transverse rib with a base flank being formed at both sides and carries an end portion of the longitudinal rib. The rib base makes the ascent towards the transverse rib by the longitudinal rib with respect to the chip guiding groove steeper so that the chips are even more powerfully deformed before the chips strike the transverse rib.

According to a further development of the chip guiding element, the chip guiding structure has a plurality of additional chip guiding elements, wherein the additional chip guiding elements are formed in the region of the chip guiding groove, wherein each additional chip guiding element has a longitudinal rib having a rib ridge and rib flanks which decline from the rib ridge at both sides, wherein the rib ridge of each additional chip guiding element, when viewed in a direction perpendicular to the cutting head plane, extends in each case substantially radially away from the cutting edge, wherein each additional chip guiding element, when viewed in a direction perpendicular to the cutting head plane, has an end portion which is free from transverse ribs, wherein each end portion is opposite the cutting edge when viewed in a direction perpendicular to the cutting head plane, wherein the additional chip guiding elements and the chip guiding elements, when viewed in a direction perpendicular to the cutting head plane, are arranged alternately in an alternating manner with respect to each other in a circumferential direction of the cutting edge. The additional chip guiding elements are constructed in a similar manner to the chip guiding elements, but with the additional chip guiding elements not having any transverse rib in the region of the transverse ribs of the chip guiding elements. The additional chip guiding elements ensure that chips which are further away from the chip guiding elements are guided to the transverse ribs without the transverse rib valleys being blocked.

According to a further development of the cutting element, the longitudinal rib of one of the additional chip guiding elements is located, when viewed in a direction perpendicular to the cutting head plane, substantially centrally on the cutting edge axis of symmetry. The longitudinal rib of the additional chip guiding element is a central chip divider which supplies the chips, when viewed in a direction perpendicular to the cutting head plane, to the adjacent transverse ribs at each side of the longitudinal rib.

According to a further development of the cutting element, in at least one additional chip guiding element the longitudinal rib has a rib hump, wherein the rib hump, when viewed in a direction perpendicular to the cutting head plane, is formed and arranged at the side of the cutting edge, wherein the rib hump protrudes from the cutting head plane. The rib hump supports the chip guiding into the chip guiding groove by the rib hump ploughing through the chips during feeding.

According to a further development of the cutting element, the chip guiding structure has a plurality of recesses at the side of the cutting edge, wherein the recesses and the chip guiding elements are arranged alternately in an alternating manner when viewed in a direction perpendicular to the cutting head plane. The recesses ensure a pre-deformation of the chips when the chips slide from the cutting edge into the chip guiding groove. Preferably, the recesses, the chip guiding elements and the additional chip guiding elements are arranged alternately in an alternating manner with respect to each other when viewed in a direction perpendicular to the cutting head plane so that one of the recesses follows one of the chip guiding elements and one of the additional chip guiding elements follows this recess. The term "recesses" is also intended to be understood to include double recesses, according to which such double recesses and the chip guiding elements are arranged alternately in an alternating manner when viewed in a direction perpendicular to the cutting head plane. Double recesses increase the deformation of the chips.

According to a further development of the cutting element, the chip guiding structure has a cutting edge chamfer, wherein the cutting edge chamfer, when viewed in a direction perpendicular to the cutting head plane, has at least one V-shaped protuberance, wherein the V-shaped protuberance extends substantially radially away from the cutting edge, is planar and with an edge being formed is connected to the rib ridge of a longitudinal rib of at least one of the chip guiding elements, wherein the rib flanks of this longitudinal rib decline from the cutting edge chamfer laterally at both sides in the region of the V-shaped protuberance. The cutting edge chamfer ensures that the chips can slide better into the chip guiding groove.

According to a further development of the cutting element, the shaft has a V-shaped groove, wherein the V-shaped groove extends along the longitudinal extent of the shaft. The V-shaped groove ensures that the cutting element at the side of the shaft in a positive-locking manner can be better clamped in a reversibly releasable manner in a cutting element holder.

According to a further development of the cutting element, the cutting element has an additional cutting head, wherein the additional cutting head is carried by the shaft opposite the cutting head. When the cutting head is worn, the cutting element can be rotated in such a manner that the feeding with the additional cutting head can be continued. The additional cutting head is preferably constructed in a similar manner to the cutting head.

According to a further development of the cutting element, the transverse rib of at least one of the chip guiding elements protrudes at least partially from the cutting head plane. The transverse rib according to this further development is particularly good at impeding the chips from being able to become coiled in the direction towards the cutting edge.

According to a further development of the cutting element, the chip guiding elements, when viewed in a direction perpendicular to the cutting head plane, are arranged symmetrically with respect to the cutting edge axis of symmetry. According to this further development, the chip removal provided by the individual chip guiding elements is produced with respect to a plurality of feed angles.

Other advantages and advantageous features of the invention will be appreciated with reference to the following description of an exemplary embodiment with reference to the appended Figures. In the drawings:

DETAILED DESCRIPTION OF THE INVENTION

Figure 1:
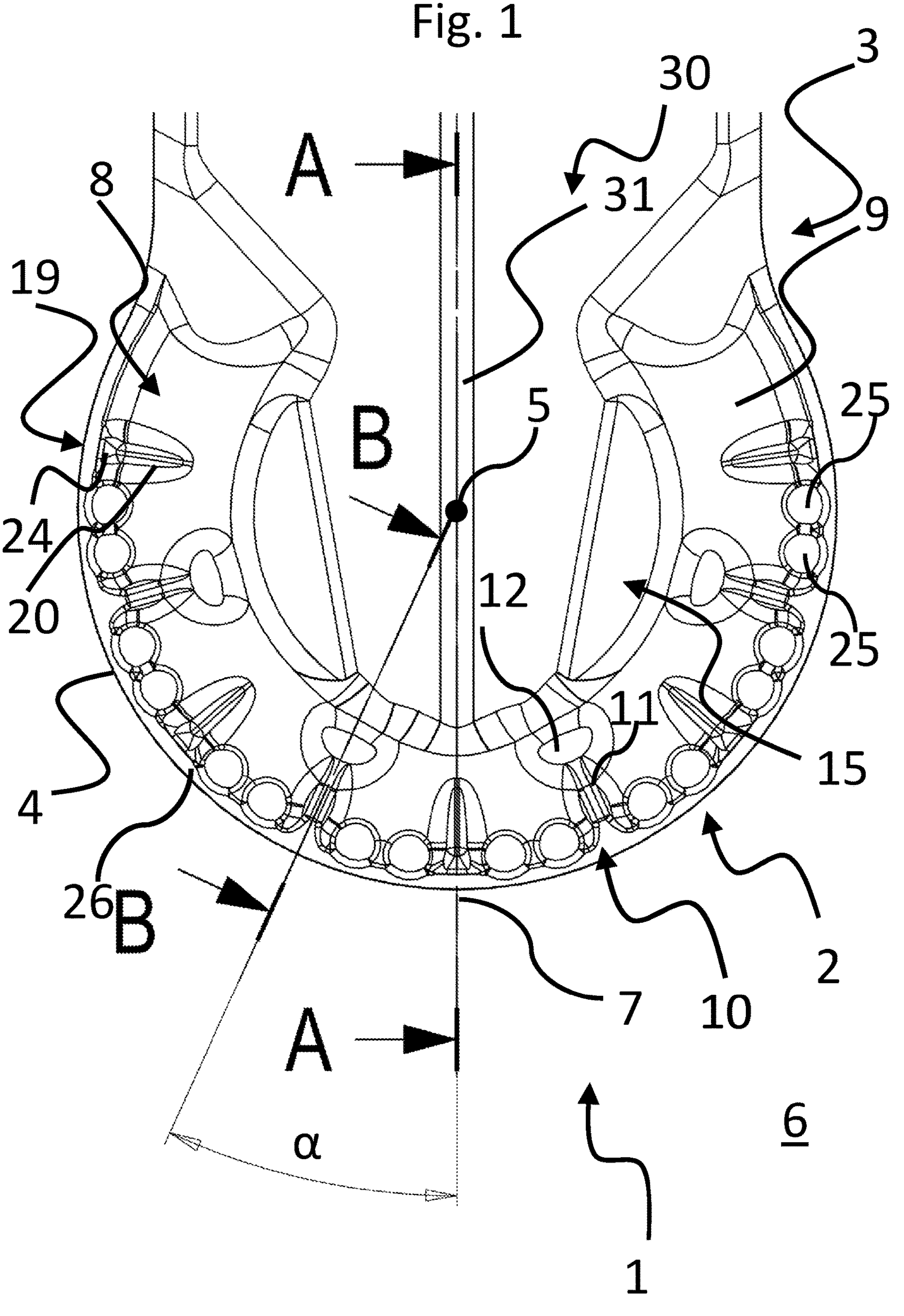
FIG. 1: shows an illustration of a cutting element in the region of a cutting head as a plan view.

One embodiment of a cutting element 1 is described with reference to FIGS. 1 to 6.

The cutting element 1 has a cutting head 2 and a shaft 3. The cutting head 2 is carried by the shaft 3 and protrudes transversely relative to the longitudinal extent of the shaft 3 over the shaft 3.

The cutting head 1 has a cutting edge 4. The cutting edge 4 follows a circle segment having a circle centre 5 at the side of the shaft 3. The cutting edge 4 is located in this instance in a virtual cutting head plane 6. The virtual cutting head plane 6 coincides in each case with the drawing plane of FIG. 1 and FIG. 2.

Figure 2:
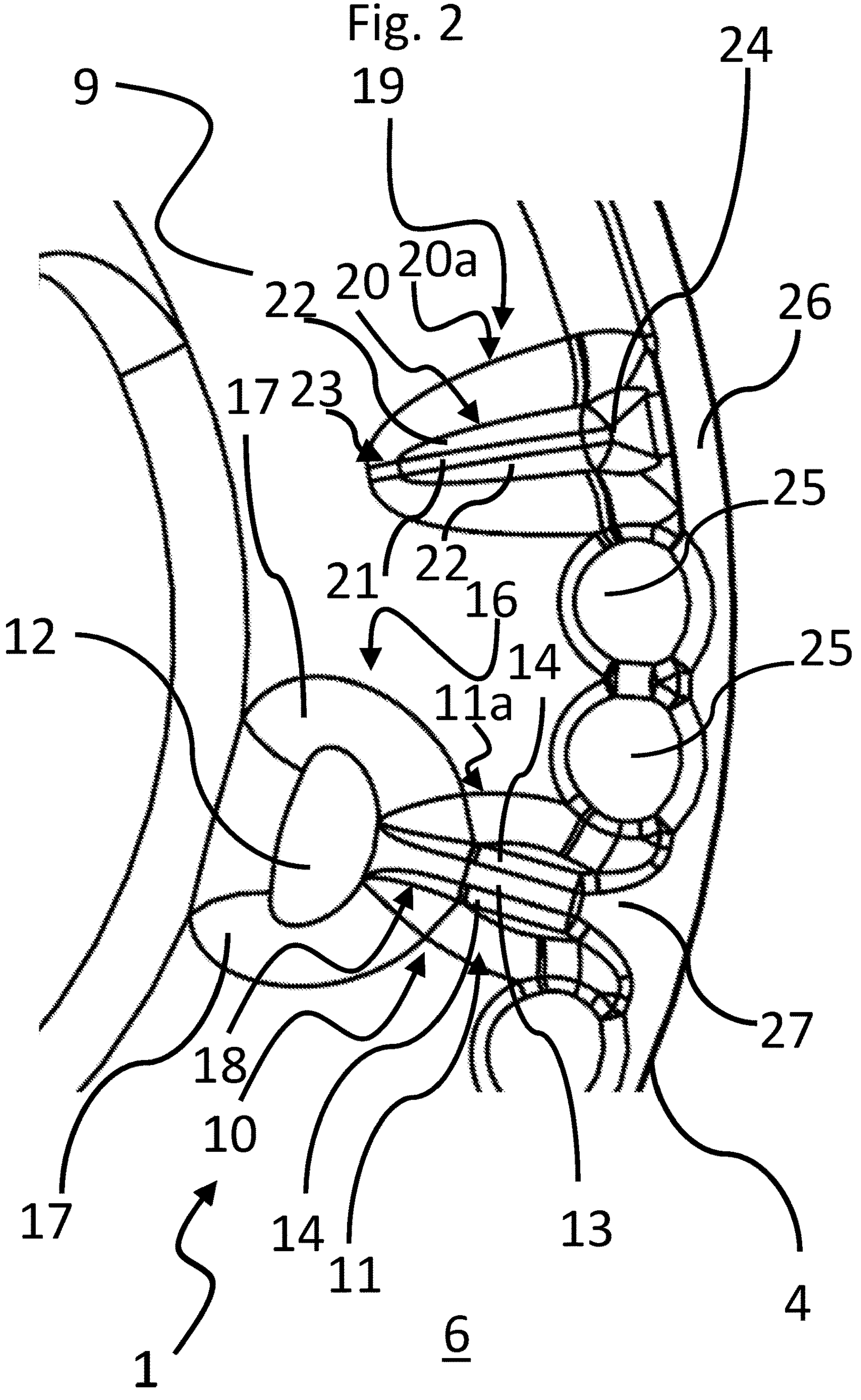
FIG. 2: shows a detailed illustration of a region of the cutting element according to FIG. 1.

The cutting edge 4, when viewed in a direction perpendicular to the cutting head plane 6, that is, when viewed in a direction perpendicular to the drawing plane of FIG. 1 and FIG. 2, is constructed symmetrically with respect to a virtual cutting edge axis 7 of symmetry contained in the cutting head plane 6.

The cutting head 2 has a chip guiding structure 8. The chip guiding structure 8 is associated with the cutting edge 4 so that chips produced by the cutting edge 4 are guided away from the cutting edge 4 during feeding with chip breakage.

The chip guiding structure 8 has a chip guiding groove 9 which is constructed to follow the cutting edge 4 when viewed in a direction perpendicular to the cutting head plane 6 and a plurality of chip guiding elements 10 which are constructed in the region of the chip guiding groove 9; of the chip guiding elements 10, in FIG. 1 for reasons of clarity only one of the chip guiding elements 10 is designated 10.

Each chip guiding element 10 has a longitudinal rib 11 and a transverse rib 12. The longitudinal rib 11 of each chip guiding element 10 has a rib ridge 13 and rib flanks which decline from the rib ridge 13 at both sides, as shown in particular in FIG. 2.

The rib ridge 13 of each longitudinal rib 13 when viewed in a direction perpendicular to the cutting head plane 6 extends radially away from the cutting edge 4 in each case and is arranged between the transvers rib 12 and the cutting edge 4, as shown in particular in FIG. 2.

The transverse rib 12 in each chip guiding element 10, when viewed in a direction perpendicular to the cutting head plane 6, protrudes transversely relative to the longitudinal extent of the rib ridge 13 beyond the rib ridge 13 at both sides so that chips when rising from the chip guiding groove 9 strike the transverse rib 12 when the chips are guided from the longitudinal rib 11.

The cutting head 2 has a central portion 15. The chip guiding groove 9 extends, when viewed in a direction perpendicular to the cutting head plane 6, between the cutting edge 4 and the central portion 15. The chip guiding groove 9 declines at the side of the cutting edge 4 and rises at the side of the central portion 15 so that the chip guiding groove 9 bends the chips so as to follow the path of the chip guiding groove 9 in a radial direction with respect to the cutting edge 4, wherein the chips are additionally deformed at locations where the chips contact the chip guiding elements 10. The transverse ribs 12 increase the degree of deformation of the chips which has already been provided per se by the chip guiding groove 9 since the transverse ribs 12 are in each case formed and arranged at the side of the incline of the chip guiding groove 9. This leads to a shorter chip breakage and counteracts the formation of snarl chips.

In each chip guiding element 10, the transverse rib 12 is, when viewed in a direction perpendicular to the cutting head plane 6, in the form of the capital letter D, wherein the curve of the capital letter D faces the cutting edge 4 when viewed in a direction perpendicular to the cutting head plane 6.

Each chip guiding element 10 has a rib base 16, wherein the rib base 16 carries the transverse rib 12 with an edge being formed with the transverse rib 12, when viewed in a direction perpendicular to the cutting head plane 6, protrudes transversely with respect to the longitudinal extent of the rib ridge 13 beyond the transverse rib 12 with a base flank 17 formation at both sides and carries an end portion 18 of the longitudinal rib 11, as shown in particular in FIG. 2. The rib base 16 makes the incline in the region of the chip guiding groove 9 steeper, whereby the chips are deformed to an even greater extent.

The chip guiding elements 10 each have a longitudinal rib base 11*a*, wherein the longitudinal rib base 11*a* carries the longitudinal rib 11 with an edge being formed with the rib flanks 14, as shown in FIG. 2. The longitudinal rib bases 11*a* make the transition from the rib flanks 14 to the chip guiding groove 9 gentler.

The chip guiding structure 8 further has a plurality of additional chip guiding elements 19; of the additional chip guiding elements 19, in FIG. 1 for reasons of clarity, only one of the additional chip guiding elements 19 is designated 19.

FIG. 2 shows for the additional chip guiding elements 19 by way of example that the additional chip guiding elements 19 are formed in the region of the chip guiding groove 9, wherein each additional chip guiding element 19 has a longitudinal rib 20 having a rib ridge 21 and rib flanks 22 which decline at both sides from the rib ridge 21, wherein the rib ridge 21 of each additional chip guiding element 19, when viewed in a direction perpendicular to the cutting head plane 6, extends in each case radially away from the cutting edge 4, wherein each additional chip guiding element 19 has, when viewed in a direction perpendicular to the cutting head plane 6, an end portion 23 which is free from transverse ribs, wherein each end portion 23, when viewed in a direction perpendicular to the cutting head plane 6, is opposite the cutting edge 4.

FIG. 2 further shows for the additional chip guiding elements 19 by way of example that the additional chip guiding elements 19 each have a longitudinal rib base 20*a*, wherein the longitudinal rib base 20*a* carries the longitudinal rib 20 with an edge being formed with the rib flanks 22. The longitudinal rib bases 20*a* make the transition from the rib flanks 22 to the chip guiding groove 9 gentler.

The additional chip guiding elements 19 and the chip guiding elements 10 are, when viewed in a direction perpendicular to the cutting head plane 6, arranged alternately in an alternating manner with respect to each other in the circumferential direction of the cutting edge 4, as shown in particular in FIG. 1. The additional chip guiding elements 19 thus subdivide the region formed between two chip guiding elements 10 which are adjacent when viewed in a direction perpendicular to the cutting head plane 6 so that the chips can be supplied to the transverse ribs 12 with a chip blockage being avoided.

One of the longitudinal ribs 20 is located, when viewed in a direction perpendicular to the cutting head plane 6, centrally on the cutting edge axis 7 of symmetry, as shown in particular in FIG. 1. When feeding parallel with the cutting edge axis 7 of symmetry, the additional chip guiding element 19 with the longitudinal rib 20 which is arranged centrally in this manner ensures that the chips are supplied to the transverse ribs 12 which are arranged at both sides for this purpose.

In each of the additional chip guiding elements 19, the longitudinal rib 20 has a rib hump 24. The rib humps 24 are in each case arranged and formed, when viewed in a direction perpendicular to the cutting head plane 6, at the side of the cutting edge 4, wherein the rib humps 24 in each case protrude from the cutting head plane 6. The rib humps 24 prevent the chips from being able to run off directly via the rib ridges 21.

The chip guiding structure 8 further has a plurality of recesses 25 at the side of the cutting edge 4; of the recesses 25, in FIG. 1, for reasons of clarity, only two of the recesses 25 are designated 25. The recesses 25 are in each case formed in pairs of two recesses 25, which can also be referred to as a dual formation of the recesses 25.

The recesses 25, the chip guiding elements 20 and the additional chip guiding elements 19 are arranged alternately in an alternating manner when viewed in a direction perpendicular to the cutting head plane 6 so that in each case between a chip guiding element 10 and an additional chip guiding element 19 two recesses 25 are arranged and formed at the side of the cutting edge 4, as shown in particular in FIG. 1. The recesses 25 ensure a pre-deformation of the chips before the chips can slide into the chip guiding groove 9 and are guided at that location from the rib flanks 14 to the transverse ribs 12.

The chip guiding structure 8 further has a cutting edge chamfer 26. The cutting edge chamfer 26 has, when viewed in a direction perpendicular to the cutting head plane 6, a plurality of V-shaped protuberances 27, wherein the V-shaped protuberances 27 extend in each case radially away from the cutting edge 4, are planar and are connected to a rib ridge 13 in each case with an edge being formed. The rib flanks 14 consequently decline from the cutting edge chamfer 26 in each case laterally at both sides in the region of the V-shaped protuberances 27, which improves the chip deformation.

Figure 3:
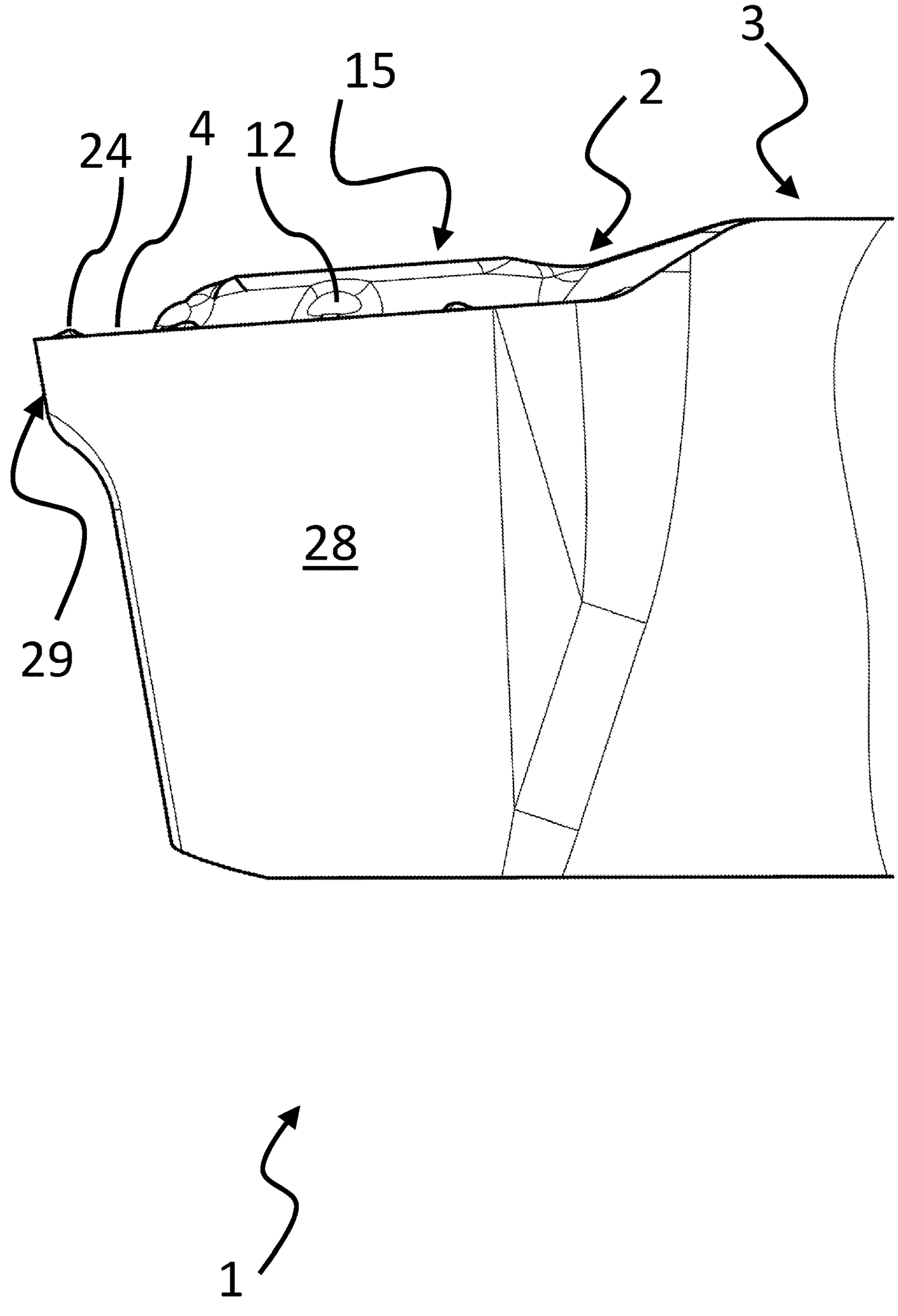
FIG. 3: shows an illustration of the cutting element according to FIG. 1 as a side view.

In FIG. 3, it can be clearly seen that the rib humps 24 protrude from the cutting head plane 6.

In FIG. 3, it can further be seen particularly clearly that the transverse ribs 12 protrude from the cutting head plane 6.

The cutting head 2 has a clearance face 28, wherein the clearance face 28 and the cutting edge chamfer 26 are connected to each other by the cutting edge 4. The clearance face 28 forms a protuberance 29 at the side of the additional cutting element 19, the longitudinal rib 20 of which is located centrally on the cutting edge axis 7 of symmetry.

When viewed in a direction perpendicular to the cutting head plane 6, two rib ridges 13 and rib ridges 21 which are adjacent to each other have a constant angle α, wherein the angle α is measured at the side of the cutting edge 4 and is in the range from 20° to 30°, preferably the angle α is 25°; in FIG. 1, for reasons of clarity, only an angle α is illustrated and the reference numerals of the rib ridges 13 and 21 are indicated in FIG. 2 by way of example for all the chip guiding elements 10 or all the additional chip guiding elements 19. The angle α in the range from 20° to 30° ensures that the chips of the transverse rib 12 are better supplied. At an angle α greater than 30°, the chips would escape laterally. At an angle α less than 20°, the chips would run up against each other and thus block the region between the chip guiding elements 10 and the additional chip guiding elements 19 in each case.

Figure 4:
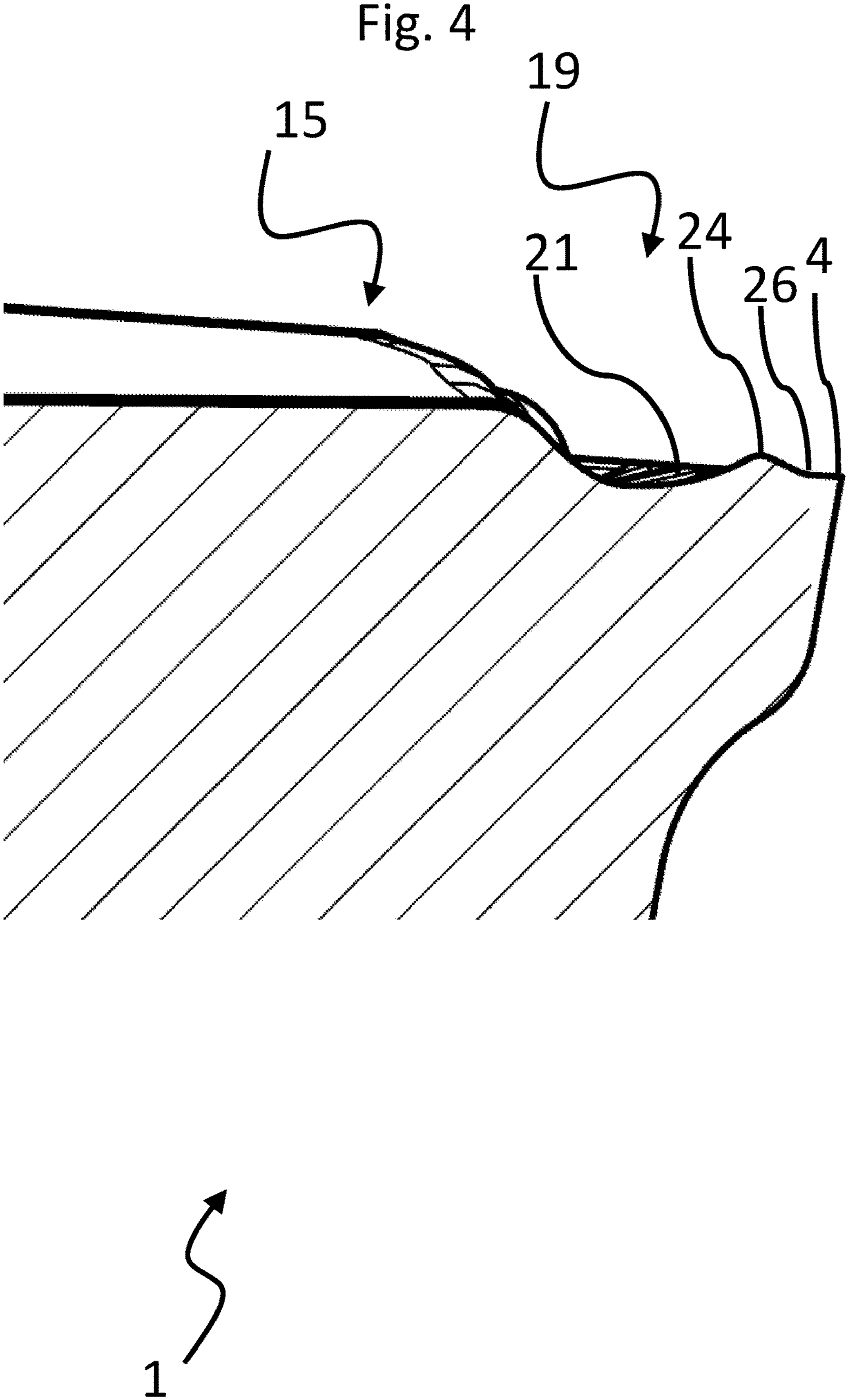
FIG. 4: shows a sectioned illustration of the cutting element according to FIG. 1 according to the lines of section A-A from FIG. 1.

The cross section which is shown in FIG. 4 and which is orientated radially with respect to the cutting edge 4 and can also be referred to as a rib longitudinal section shows for the additional chip guiding elements 19 by way of example that the longitudinal ribs 20 are in each case curved in a concave manner between the rib hump 24 and the central portion 15.

Figure 5:
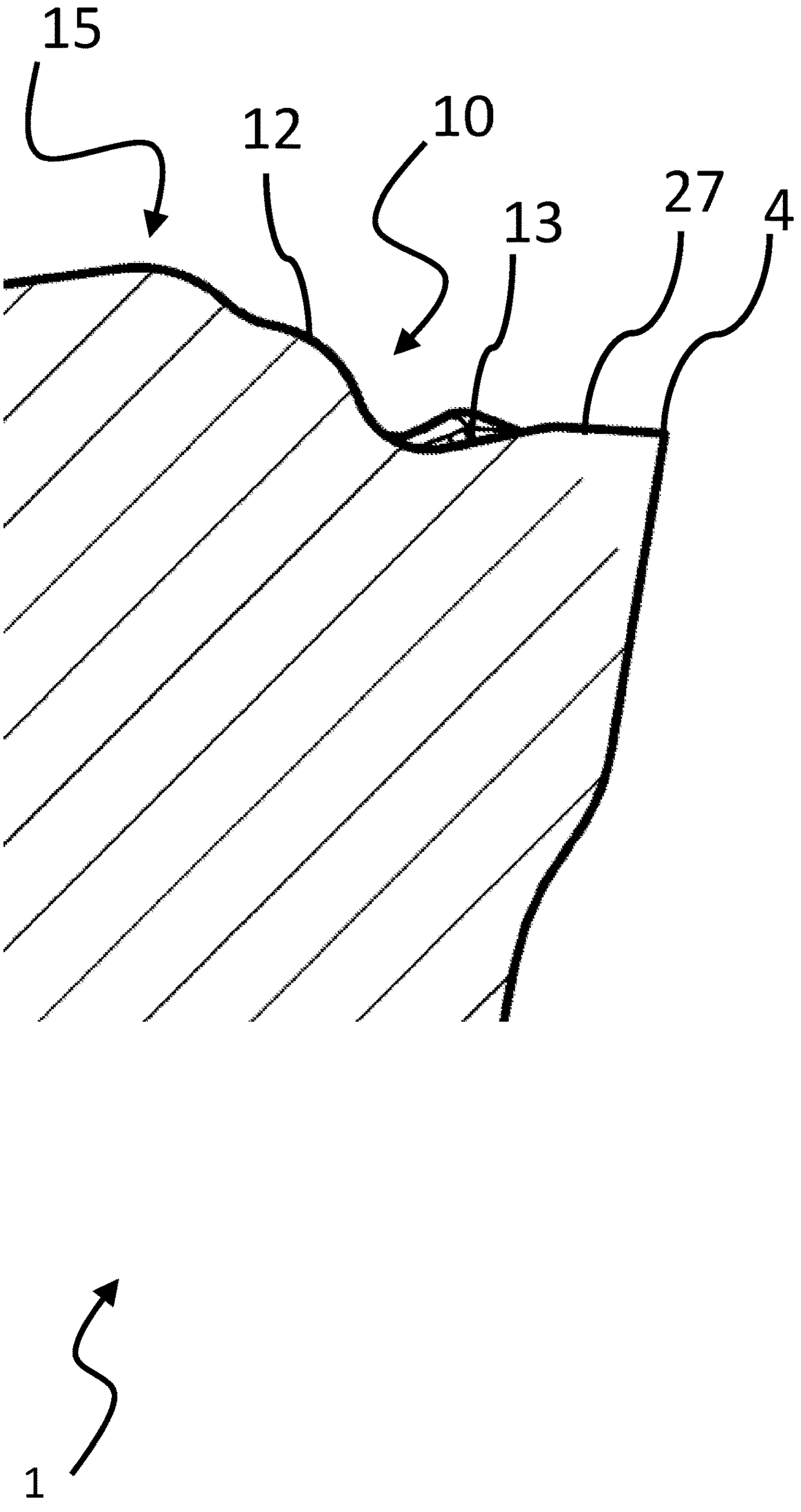
FIG. 5: shows a sectioned illustration of the cutting element according to FIG. 1 according to the lines of section B-B from FIG. 1.

The cross section which is shown in FIG. 5 and which is orientated radially with respect to the cutting edge 4, and which can also be referred to as a rib longitudinal section, shows for the chip guiding elements 10 by way of example that the transverse rib 12 at the side of the rib ridge 13 is curved in a convex manner and that the longitudinal rib 11 at the side of the cutting edge 4 is curved in a concave manner so that chips which run on the rib ridge 13 are formed to follow the convex curvature and strike the transverse rib 12.

The chip guiding elements 10 are consequently in the radial rib longitudinal section thereof in the form of a capital letter S, wherein one curve of the capital letter S is formed in the region of the transverse rib 12 so that the transverse rib 12 bends outwards, wherein the other curve of the capital letter S is formed in the region of the rib ridge 13 so that the rib ridge 13 bends inwards.

Figure 6:
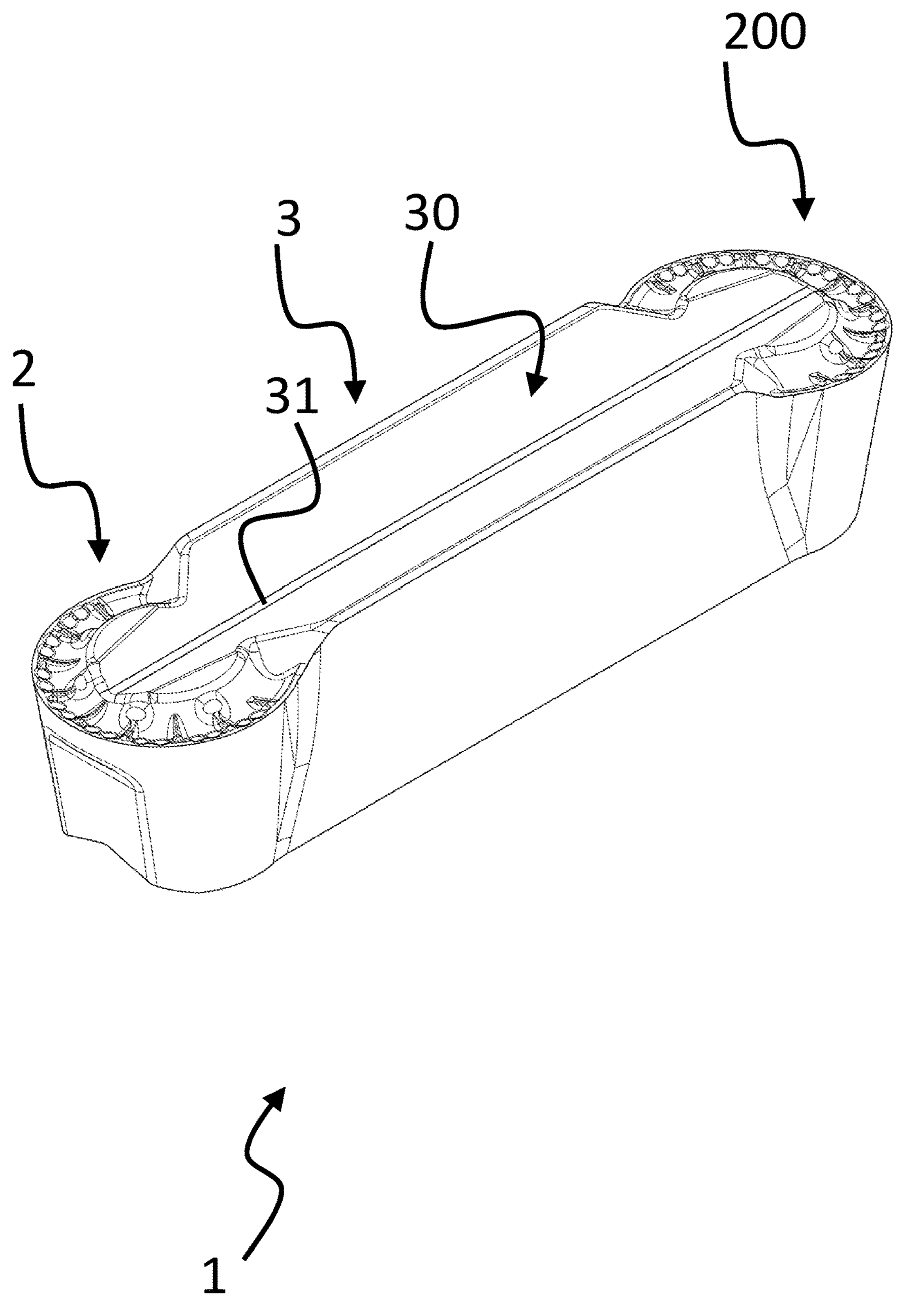
FIG. 6: shows a perspective illustration of the cutting element according to FIG. 1.

FIG. 6 shows a perspective illustration of the cutting element 1, according to which it can be seen that the cutting element 1 has an additional cutting head 200 which is constructed in a similar manner to the cutting head 2. The additional cutting head 200 is carried by the shaft 3 opposite the cutting head 1 so that, after a rotation of the shaft 3 which brings the cutting head 200 into the position of the cutting head 2, a feed operation can be continued.

The shaft 3 has a V-shaped groove 30 by means of which the cutting element 1 can be clamped in a holder in a positive-locking manner. The V-shaped groove 30 consequently extends along the longitudinal extent of the shaft 3.

The V-shaped groove 30 has in the groove base thereof a U-shaped groove 31 The U-shaped groove 31 and the V-shaped groove 30 extend into the central portion 15, wherein the U-shaped groove 31 ensures a coolant supply of the cutting edge 4.

The present invention is not limited to the embodiment of the cutting element 1 as shown in FIGS. 1 to 6. It is also conceivable and possible for the cutting element 1 to be produced without the additional cutting elements 19 and/or without the recesses 25.

It is further conceivable and also possible for only one of the chip guiding elements 10 to have the transverse rib 12 or preferably only two of the chip guiding elements 10 to have the transverse rib 12 in each case.

The invention claimed is:

1. A cutting element, comprising:

a cutting head having a cutting edge;

a shaft carrying said cutting head, said cutting head protruding over said shaft transversely relative to a longitudinal extent of said shaft;

wherein said cutting edge follows a circle segment with a circle center at a side of said shaft, is disposed in a virtual cutting head plane and is constructed symmetrically, when viewed in a direction perpendicular to the virtual cutting head plane, with respect to a virtual cutting edge axis of symmetry which is contained in the virtual cutting head plane; and wherein said cutting head has a chip guiding structure, wherein said chip guiding structure is in a region of said cutting edge, wherein said chip guiding structure has a chip guiding groove formed therein which is constructed to follow said cutting edge when viewed in the direction perpendicular to the virtual cutting head plane, said chip guiding structure further having a plurality of chip guiding elements which are constructed in a region of said chip guiding groove, wherein each of said chip guiding elements has a longitudinal rib and a transverse rib, wherein said longitudinal rib of each said of chip guiding elements has a rib ridge and rib flanks which decline from said rib ridge at both sides, wherein said rib ridge of each said longitudinal rib, when viewed in the direction perpendicular to the virtual cutting head plane, extends in each case substantially radially away from said cutting edge and is disposed between said transverse rib and said cutting edge, wherein in each of said chip guiding elements said transverse rib protrudes, when viewed in the direction perpendicular to the virtual cutting head plane, transversely relative to a longitudinal extent of said rib ridge over said rib ridge so that chips when rising from said chip guiding groove strike said transverse rib when the chips are guided by said longitudinal rib.

2. The cutting element according to claim 1, wherein said transverse rib in at least one of said chip guiding elements, in a rib longitudinal section which is orientated radially with respect to said cutting edge, when viewed in a direction perpendicular to the rib longitudinal section, is curved in a convex manner at a side of said rib ridge.

3. The cutting element according to claim 2, wherein said longitudinal rib, in said at least one chip guiding element in said rib longitudinal section which is orientated radially with respect to said cutting edge, when viewed in the direction perpendicular to the rib longitudinal section, is curved in a concave manner at a side of said cutting edge.

4. The cutting element according to claim 1, wherein at least one of said chip guiding elements is in a rib longitudinal section orientated radially with respect to said cutting edge, when viewed in a direction perpendicular to the rib longitudinal section, in a form of a capital letter S, wherein one curve of the capital letter S is formed in a region of said transverse rib so that said transverse rib is curved outwards, wherein another curve of the capital letter S is formed in a region of said rib ridge so that said rib ridge is curved inwards.

5. The cutting element according to claim 1, wherein in at least one of said chip guiding elements said transverse rib, when viewed in the direction perpendicular to the virtual cutting head plane, protrudes over said rib ridge at both sides transversely relative to the longitudinal extent of said rib ridge.

6. The cutting element according to claim 1, wherein in at least one of said chip guiding elements said transverse rib is, when viewed in the direction perpendicular to the virtual cutting head plane, in a form of a capital letter D, wherein a curve of the capital letter D faces said cutting edge when viewed in the direction perpendicular to the virtual cutting head plane.

7. The cutting element according to claim 1, wherein at least one of said chip guiding elements has a rib base, wherein said rib base carries said transverse rib with an edge being formed with said transverse rib, protrudes, when viewed in the direction perpendicular to the virtual cutting head plane, transversely with respect to the longitudinal extent of said rib ridge over said transverse rib with a base flank being formed at both sides and carries an end portion of said longitudinal rib.

8. The cutting element according to claim 1, wherein said chip guiding structure has a plurality of additional chip guiding elements, wherein said additional chip guiding elements are formed in a region of said chip guiding groove, wherein each of said additional chip guiding elements has an additional longitudinal rib with an additional rib ridge and additional rib flanks which decline from said additional rib ridge at both sides, wherein said additional rib ridge of each of said additional chip guiding elements, when viewed in the direction perpendicular to the virtual cutting head plane, extends in each case substantially radially away from said cutting edge, wherein each of said additional chip guiding elements, when viewed in the direction perpendicular to the virtual cutting head plane, has an end portion which is free from transverse ribs, wherein each said end portion is opposite said cutting edge when viewed in the direction perpendicular to the virtual cutting head plane, wherein said additional chip guiding elements and said chip guiding elements, when viewed in the direction perpendicular to the virtual cutting head plane, are disposed alternately in an alternating manner with respect to each other in a circumferential direction of said cutting edge.

9. The cutting element according to claim 8, wherein said additional longitudinal rib of one of said additional chip guiding elements is disposed, when viewed in the direction perpendicular to the virtual cutting head plane, substantially centrally on the virtual cutting edge axis of symmetry.

10. The cutting element according to claim 8, wherein, in at least one of said additional chip guiding element said additional longitudinal rib has a rib hump, wherein said rib hump, when viewed in the direction perpendicular to the virtual cutting head plane, is formed and disposed at said side of said cutting edge, wherein said rib hump protrudes from the virtual cutting head plane.

11. The cutting element according to claim 1, wherein said chip guiding structure has a plurality of recesses formed therein at said side of said cutting edge, wherein said recesses and said chip guiding elements are disposed alternately in an alternating manner when viewed in the direction perpendicular to the virtual cutting head plane.

12. The cutting element according to claim 1, wherein said chip guiding structure has a cutting edge chamfer, wherein said cutting edge chamfer, when viewed in the direction perpendicular to the virtual cutting head plane, has at least one V-shaped protuberance, wherein said V-shaped protuberance extends substantially radially away from said cutting edge, is planar and with an edge being formed is connected to said rib ridge of said longitudinal rib of at least one of said chip guiding elements, wherein said rib flanks of said longitudinal rib decline from said cutting edge chamfer laterally at both sides in a region of said V-shaped protuberance.

13. The cutting element according to claim 1, wherein said shaft has a V-shaped groove formed therein, wherein said V-shaped groove extends along the longitudinal extent of said shaft.

14. The cutting element according to claim 1, further comprising an additional cutting head, wherein said additional cutting head is carried by said shaft opposite said cutting head.

15. The cutting element according to claim 1, wherein said transverse rib of at least one of said chip guiding elements protrudes at least partially from the virtual cutting head plane.

* * * * *